March 9, 1943. R. C. WAPPNER ET AL 2,313,688

THERMOMETER

Filed Oct. 20, 1941

INVENTORS
Ralph C. Wappner
Frank M. Osborne
BY Staley & Welch
ATTORNEYS.

Patented Mar. 9, 1943

2,313,688

UNITED STATES PATENT OFFICE 2,313,688

THERMOMETER

Ralph C. Wappner and Frank M. Osborne, Springfield, Ohio, assignors to The Ohio Thermometer Company, Springfield, Ohio, a corporation of Ohio Application October 20, 1941, Serial No. 415,799

3 Claims. (Cl. 73—374)

This invention relates to improvements in means for making thermometers, it more particularly relating to means for making the casing which encloses the thermometer tube and its bulb.

One of the objects of the invention is to provide a casing for a thermometer which may be cheaply constructed of moulded material and readily assembled.

A further object is to provide a two-part thermometer casing of moulded material, the rear part of which is formed of moulded material chambered to receive the thermometer tube and its bulb and the front part of which is formed of clear transarent material, the two parts being adated to be readily secured together by means which do not require the use of bolts, screws, or other similar fastening devices.

A further object of the invention is to provide a thermometer casing formed of two parts, one part of which is adapted to receive the thermometer tube and its casing and indicia to indicate the temperature, and the other part of which is formed of clear transparent material so shaped as to magnify the indicia.

A further object of the invention is to provide a two-part thermometer casing together with suspension devices for the casing of a simple character which are held in position when the two parts of the casing are assembled.

Figure 1:
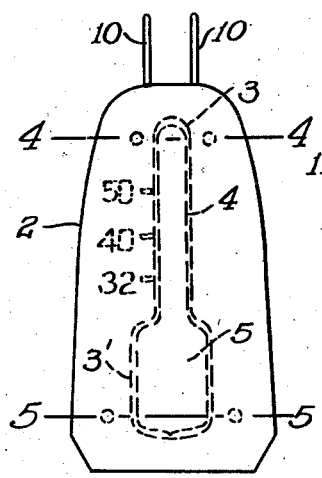
Fig. 1 is a front elevation of a thermometer casing embodying the improvements.
Figure 3:
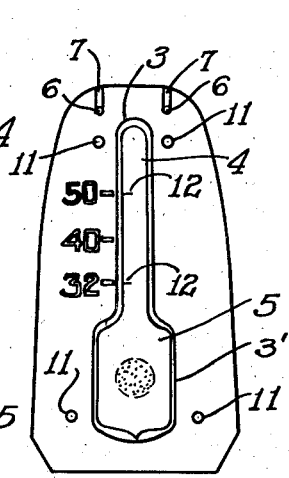
Fig. 3 is a front elevation of the rear member of the casing with the thermometer tube and its bulb in position therein.
Figure 2:
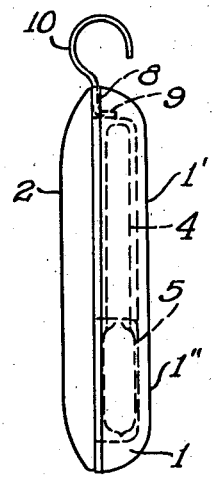
Fig. 2 is a side elevation of the thermometer casing.
Figure 4:
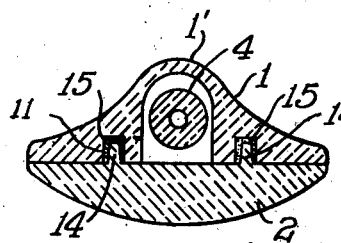
Fig. 4 is an enlarged section on the line 4—4 of Fig. 1.
Figure 5:
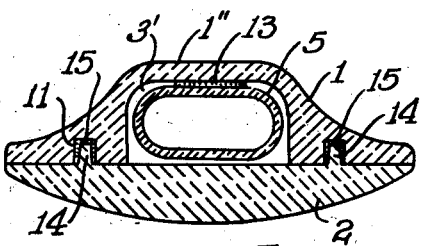
Fig. 5 is an enlarged section on the line 5—5 of Fig. 1.
Figure 6:
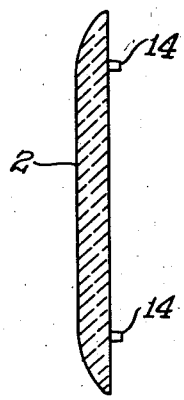
Fig. 6 is a section taken through the vertical center of the front member of the casing on the same scale shown in Figs. 1, 2 and 3.
Figure 7:
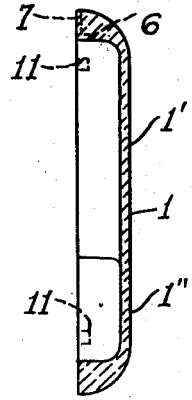
Fig. 7 is a section taken through the vertical center of the rear member of the casing on the same scale shown in Figs. 1, 2 and 3.

Referring to the drawing, 1 represents the rear member of a thermometer casing and 2 the front member thereof. The rear member 1 of the casing is formed of moulded water-proof composition, tenite No. 2 plastic being found suitable for the purpose. The rear portion of the casing is preferably made opaque although this is not necessary as it may be of a transparent or translucent character. The rear portion 1 of the casing is centrally bulged as indicated at 1' in Fig. 4, the lower part of the bulge being enlarged transversely as shown at 1'' in Fig. 5, so as to provide room for a chamber, the upper portion 3 of which is comparatively narrow to receive the thermometer tube 4 and the lower portion 3' of which is enlarged to receive the comparatively large bulb 5 of the thermometer tube. Moulded into the upper portion of the casing member 1 are small apertures 6 approached by slots 7 for the purpose of receiving the shanks 8 and bent ends thereof 9 of suspension hooks 10, the parts of one of which suspension hooks is shown best in Fig. 2. Also moulded into the front flat face of the rear casing member 1 are additional apertures 11, preferably four in number, for the purpose to be explained. The front flat face of the rear casing member 1 bears temperature indicating indicia such as 32, 40 and 50, and the thermometer tube 4 is provided with small scribes 12 to enable the thermometer tube and its bulb to be properly registered with the indicia. In order to secure the thermometer tube and its bulb in its chamber formed in the rear casing member there is applied to the rear wall of the chamber a coating of glue, cement, or other adhesive material 13 and the workman by placing the rear sides of the bulb and tube in the chamber upon the cement with the scribes 12 registering with the proper indicia can readily assemble the thermometer tube and bulb in the chamber. Also, if desired, a small amount of cement, glue or the like may be placed in the apertures 6 to assist in securing the hooks 10 in position although after the front member 2 of the casing has been assembled that will ordinarily suffice to hold the hooks in position.

The front member 2 of the casing is moulded from any suitable clear water-proof plastic so as to render it transparent in order that the thermometer tube and the indicia may be observed, "lumrith" being found to be a suitable material. The rear face of the front member is formed flat so as to mate with the flat forward face of the rear casing member, while the forward face of the front casing member 2 is rounded so as to impart a magnifying effect to the indicia. Moulded on the front casing member 2 are a plurality of protuberances in the form of round pegs 14, one for each hole 11 and mating therewith. Before assembly there is placed in the holes 11 cement, glue or the like as indicated at 15, so that when the protuberances are inserted in the cement in the holes the two members of the casing will be held firmly together.

Having thus described our invention, we claim:

1. In a thermometer, a two-part casing consisting of a rear member and a front transparent member having mating flat faces, means for securing said members together, said rear member having a chamber, a thermometer tube and its bulb secured in said chamber, the forward face of said rear member having in its upper portion at least one aperture approached by a groove, a hooked-shaped suspension device having a shank and a bent end, said shank and bent end being adapted to be located in said groove and aperture and overlapped by said front member when the parts are assembled.

2. In a thermometer, a two-part casing having a rear member and a transparent front member, said rear member having a chamber, and a thermometer tube and its bulb located in said chamber, said rear member having a forward flat face bearing temperature indicia, said forward member having a rear flat face to mate with the flat face of said rear member and said forward member having a rounded forward face for the purpose specified.

3. In a thermometer, a two-part casing having a rear member and a transparent front member, said rear member having a chamber, a thermometer tube and its bulb located in said chamber, one of said members having a series of apertures, protuberances on the other of said members adapted to register with said apertures and be received therein, said rear member having a forward flat face bearing temperature indicia, said forward member having a rear flat face to mate with the flat face of said rear member and said forward member also having a rounded forward face extending the entire width thereof.

RALPH C. WAPPNER.
FRANK M. OSBORNE.